United States Patent [19]

Gray

[11] Patent Number: 4,562,025
[45] Date of Patent: Dec. 31, 1985

[54] MOLD METHOD AND APPARATUS FOR MULTI-COLOR PLASTIC SHELLS

[75] Inventor: John D. Gray, New Durham, N.H.

[73] Assignee: Ex-Cell-O Corporation, Troy, Mich.

[21] Appl. No.: 614,004

[22] Filed: May 25, 1984

[51] Int. Cl.[4] .................. B29C 39/12; B29C 41/04
[52] U.S. Cl. .................. 264/126; 264/245; 264/250; 264/310; 264/DIG. 60; 425/257; 425/434
[58] Field of Search .............. 264/261, 245, 126, 310, 264/250, 255, 254, DIG. 60; 425/256, 257, 580, 581, 582, 435, 430, 434

[56] References Cited

U.S. PATENT DOCUMENTS

| 178,308 | 6/1976 | Leathers et al. | 264/245 |
|---|---|---|---|
| 2,115,249 | 4/1938 | Bowman | 264/254 |
| 3,796,622 | 3/1974 | Brody | 264/245 |
| 4,076,567 | 2/1978 | Yoshikawa et al. | 264/126 |
| 4,157,883 | 6/1979 | Mares | 264/255 |
| 4,191,726 | 3/1980 | Stillhard et al. | 264/126 |
| 4,275,028 | 6/1981 | Cohen | 264/126 |
| 4,335,068 | 6/1982 | Hemery | 264/245 |
| 4,405,539 | 9/1983 | Schulte et al. | 264/245 |
| 4,460,530 | 7/1984 | Hanson et al. | 264/126 |

FOREIGN PATENT DOCUMENTS

| 675434 | 12/1963 | Canada | 264/126 |
|---|---|---|---|
| 0070356 | 11/1977 | Japan | 264/245 |
| 0108870 | 8/1979 | Japan | 264/250 |
| 0057727 | 4/1984 | Japan | 264/250 |

Primary Examiner—Willard E. Hoag
Attorney, Agent, or Firm—John C. Evans

[57] ABSTRACT

Apparatus and a process for manufacturing multiple color thin walled hollow shells for parts such as automobile door panels, controls and instrument panels from thermoplastic plastisol includes a plastisol box divider to form two or more compartments in a plastisol charge box and means for joining the charge box divider end-to-end with a mold separation edge on an open-ended heated mold for separating the mold into two or more sections; each compartment of the charge box has a different color plastisol. The charge box and mold are joined and then are rotated so that the plastisol is distributed into each mold section by gravity flow with the plastisol from each section flowing to the divider which separates the colors so as to form two or more tones on a resultant shell of cured material.

13 Claims, 12 Drawing Figures

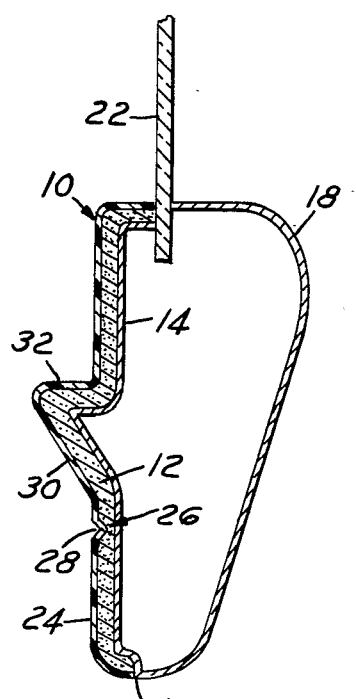
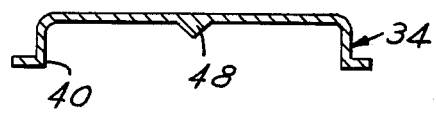
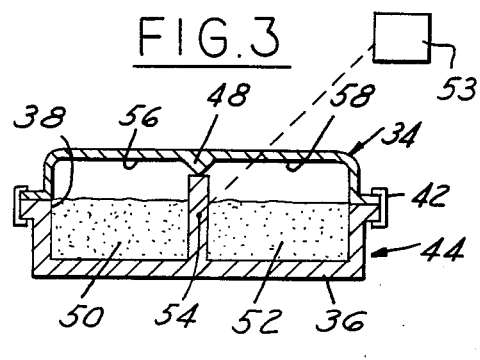
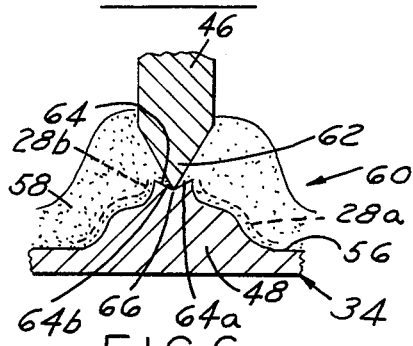
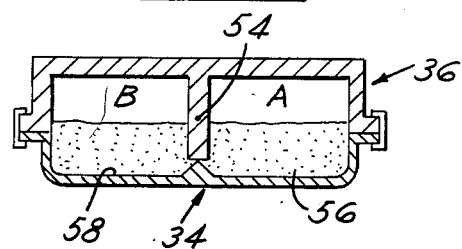
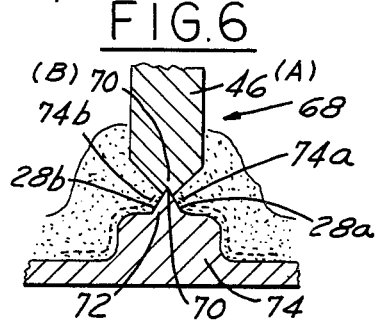
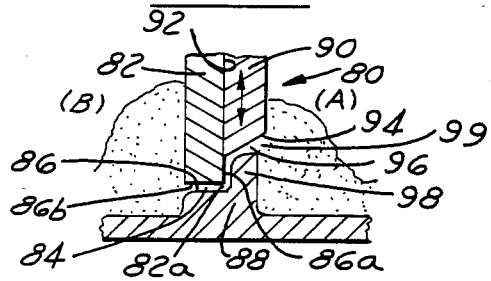

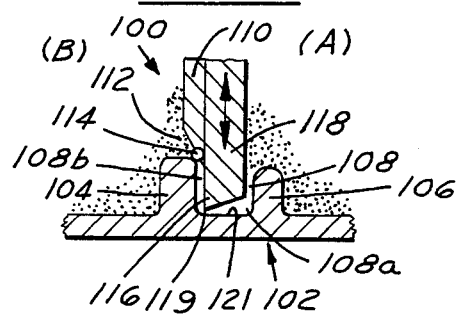
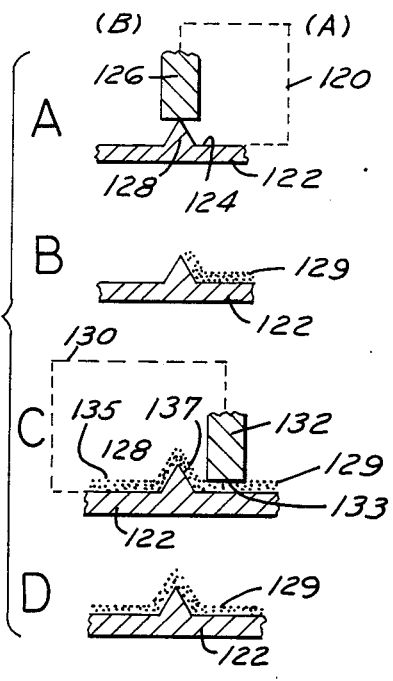

MOLD METHOD AND APPARATUS FOR MULTI-COLOR PLASTIC SHELLS

TECHNICAL FIELD

This invention pertains to an improved plastic shell and a method and apparatus for making such articles especially suitable for use in automobile trim components such as interior door panels and more particularly to two-tone plastic shells and method and apparatus for processing plastic powder to form such articles to have two or more tone colors.

BACKGROUND ART

The automotive industry has turned to the use of interior trim components such as door panels comprising a polyvinyl chloride shell. See, for example, the trim components disclosed in U.S. Pat. No. 3,123,403. The acceptance of such components has been because inter alia this type of construction permits a wide latitude in styling and color, and grain effects which are most desired particularly in the interior design of automobiles.

The current state of the art includes a pre-formed grained vinyl shell made from dry thermoplastic powder particles which are applied to a heated shell mold from a powder box to form a continuous monochromatic one-piece shell.

In order to enhance the interior decor of an automobile, interior door panels and other parts have been prepared which include two separate plastic shell sections formed form different colored plastic joined at a connection joint.

The use of multi-color plastic is also known in the manufacture of colored filaments. Such manufacture includes use of a compartmented spinning head for making two-colored yarn as disclosed in U.S. Pat. No. 3,049,397 issued Aug. 14, 1962 for Process of Making Space-Dyed Yarn.

Apparatus and method for multiple colored thermoplastic floor materials are set forth in U.S. Pat. No. 3,383,442 issued May 14, 1968.

Neither of the aforesaid methods and apparatus for manufacture or resultant manufacture is directed to a process or apparatus for manufacturing a single piece shell suitable for use as an interior panel component of an automobile.

STATEMENT OF INVENTION AND ADVANTAGES

In accordance with the present invention a process and apparatus for loading an open-ended heated mold with powder plastisol material includes the process of releasing a pre-charge of two or more colors of thermoplastic powder from separate compartments in charge box means for gravity flow into a mold with means configured to produce a one-piece shell with two or more color tones to enhance the decor of the interior of an automobile.

Open-ended charge box means is provided with divider means to form two or more separate compartments; each of which is filled with a predetermined quantity of different color powder. The loaded open-ended charge box means is clamped to an open-ended mold to form a closed system. The mold has a joint seal which cooperates with the divider means to separate the powder content in each compartment of the charge box means. The closed system is rotated so that the charge box releases the powder from the separate charge box compartments to flow evenly across the open end of the mold by gravity and against the joint seal so as to produce a uniform thin shell across heated surfaces of the mold with distinct strips of colors in a single-piece article with an integral joint formed between each color.

Plastics molding apparatus of the invention has a gravity fill system for flow of powder material into a heated mold to form a thin walled single plastic part of multi-color and for return of excess powder material from the mold including charge box means having a plurality of separate compartments; each adapted to be filled with a different color plastic powder and each extending across an open end of the powder box means; means for coupling the powder box to the mold and for partitioning the mold to receive a single color plastic powder at each of a plurality of separate surface regions on the mold; and means for operating the coupled box and mold to dispose the charge box with respect to the mold for gravity flow of powder from each of the separate powder box compartments into the partitioned mold so that flow of powder into the mold covers uniformly heated separate surfaces of the mold with a different color of plastic connected at a joint region to form a single part with at least two color panels there across.

The molded part of the invention is a single-piece plastic shell formed from cast thermoplastic powder with two or more color panels joined by integrally formed joint means. The shell may be backed with a layer of reaction injection mold material or reinforced reaction injection mold material of urethane composition.

Other advantages and a more complete understanding of the invention will be apparent to those skilled in the art from the succeeding detailed description of the invention and the accompanying drawings thereof.

BRIEF DESCRIPTION OF DRAWINGS

FIG. 1 is a schematic view of a single-piece multi-color panel of the present invention shown with associated component parts of an automotive vehicle door panel;

FIG. 2 is a diagrammatically shown sectional view of a mold component of the inventive apparatus;

FIG. 3 is a diagrammatically shown sectional view of a powder box of the invention sealed to the mold of FIG. 2 in a pre-release position;

FIG. 4 is a sectional view like FIG. 3 showing the powder box and mold in a powder release orientation;

FIG. 5 is a fragmentary, enlarged sectional view of a V-type joint for forming an integral joint between the different color panels of a multi-color single piece shell;

FIG. 6 is a fragmentary, enlarged sectional view of another embodiment of the V-type joint of FIG. 5;

FIG. 7 is a fragmentary, enlarged sectional view of a metering plate joint to form an integral joint in a multi-colored single piece part formed by the process of the present invention;

FIG. 8 is a fragmentary, enlarged sectional view of another embodiment of the metering plate joint of FIG. 7;

FIG. 9 is a diagrammatically shown process sequence of a second embodiment of the process of the present invention;

DETAILED DESCRIPTION OF THE INVENTION

Figure 10:
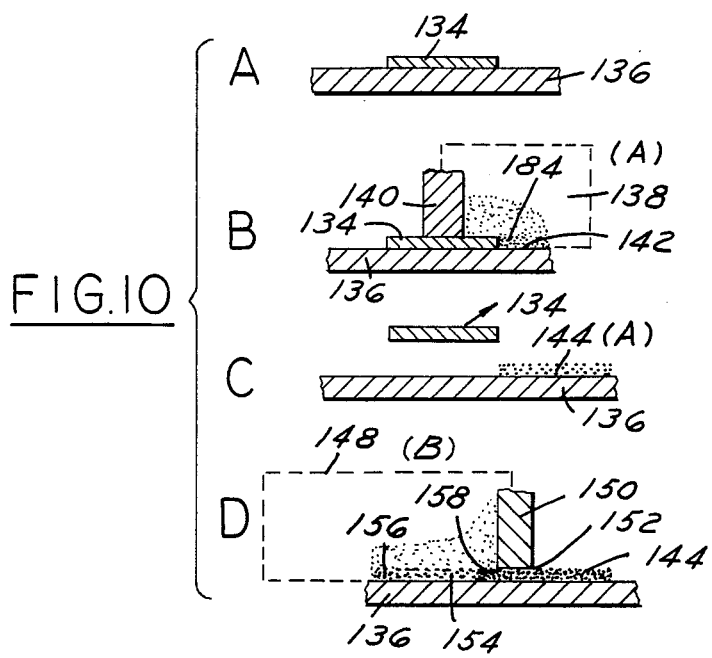
FIG. 10 is a diagrammatically shown process sequence of another embodiment of the process of the present invention.
Figure 11:
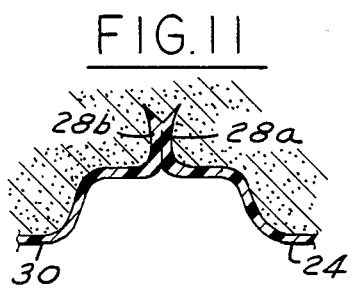
FIG. 11 is an enlarged, fragmentary sectional view of the joint configuration of a shell formed by the V-joint of FIG. 5.

The process, apparatus and article of the present invention will be with reference to the production of plastic thin-walled shells for a typical automotive part such as an interior door panel, consoles and instrument panels.

FIG. 1 shows a typical automobile door panel application of a multi-color, single-piece interior plastic shell 10. The shell 10, preferably made of polyvinyl chloride material, is backed by a layer of polyurethane foam 12 bonded to the shell 10 by a mold process such as in U.S. Pat. No. 3,123,403, issued Mar. 3, 1964 for Automobile Arm Rest. An interior reinforcing insert 14 is connected at a joint 16 to an outer door shell 18 to form an interior space 20 for window lift mechanism (not illustrated) to raise and lower a window 22.

In accordance with the present invention the shell is a one-piece plastic part with an integral lower panel 24 of a drycast plastic having a first color. The shell 10 includes an integral joint 26 which is at the base of a recessed groove 28. The groove 28 forms a transition to an integrally formed upper panel 30 including an armrest segment 32 formed of drycast plastic having a second color contrasting or complementing the color of the first panel 24 or other interior components. For example, the upper panel can be red, blue, yellow or beige to contrast with or complement the interior color of seats, headliners, crashpads and the like. The lower panel 24 can be colored a deeper complementary tone color of a character which has a low impact or scuff display character.

Referring to FIGS. 2-4, a powder molding process line is schematically shown as including selectively heated mold 34. A powder box 36 is operated between raised and lowered positions with respect to the mold 34 by suitable handling equipment, one type of which is specifically set forth in co-pending U.S. Ser. No. 500,760 filed June 3, 1983 for Mold Loading Method and Apparatus.

The box 36 further includes an upper open end 38 which is configured to cover the planar extent of an opening 40 to mold 34.

Clamp means 42 join and seal the powder charge box 36 to mold 34 when the box 36 is elevated to the position shown in FIG. 3, hereinafter referred to as the "mold-up" position.

As a result, the interior of box 36 and the interior of mold 34 form a closed system 44 having powder charges in the box 36.

In accordance with the process and apparatus of the present invention, the box 36 is provided with a divider 46 and the mold 34 has a joint-forming rib 48 that contact each other when the box and mold are joined.

The divider 46 and rib 48 form two separate compartments 50,52 each containing a charge of plastic powder material of a different color (color A in 50, color B in 52).

The next process step includes concurrent rotation of the closed system 44 by drive means 53 about axis 54 defined by trunnions means of the type set forth in co-pending U.S. Ser. No. 500,760 through 180° relative to the FIG. 3 position.

At FIG. 4 a fill step of the process takes place in which thermoplastic powder is distributed evenly throughout the mold opening 40. A resultant even build-up of plastic powder occurs on pre-heated surfaces 56,58 of the mold 34. The inverted mold position shown in FIG. 4 will hereinafter be referred to as the "mold-down" position.

Following the fill step, the joined mold 34 and charge box 36 are again rotated 180° so that the mold 34 is located vertically above the box 36 in the mold-up position.

An air-jet system of the type shown in the co-pending U.S. Ser. No. 500,760 may be used to dislodge excess powder from the walls of the mold so that the dislodged material will flow by gravity return to the interior of the box for collection and reuse in the system.

A powder fuse cycle is then carried out in accordance with known practice wherein the molded powder is completely fused into the desired thin-walled hollow part. Before the fuse cycle the charge box is unclamped from the inverted mold 34 and the box 36 is returned to a powder make-up position. Thereafter the mold 34 (with the powder cast to the surface) is heated further to fuse the powder, then is cooled and rotated 180° into a strip position corresponding to the mold-down position. Make-up powder of appropriate color is fed to the multiple separate color compartments.

In the embodiment of FIG. 5 a V-type joint 60 is shown. The joint 60 is defined by a V-shaped tip 62 on the divider 46 which is seated in a concave surface 64 on a joint-forming rib 66 (corresponding to rib 48 of mold 34) when the box 36 and mold 34 are joined as shown in FIG. 3. The joint 60 is illustrated in the position which is assumed in the fill step of FIG. 4. The color A powder is cast on surface 56 and the color B powder is cast on surface 58. Color A powder fills region 64a between tip 62 and concave surface 64 and Color B powder fills region 64b between tip 62 and concave surface 64 and a build-up of powder of different colors adheres to the mold along a joint line defined by the sharp edge 66 of tip 62.

Once the powder is cast and adhered to the heated mold surface the system is rotated back to the position shown in FIG. 3. Excess powder returns to the separate mold color compartments 50,52 and the powder box is removed. The mold 34 remains in its mold-up position during a first cure stage. Then the mold 34 is rotated to the mold-down position to cause the partially cured plastic in regions 64a and 64b to join at the center of concavity 66.

In the embodiment of FIG. 6 a reverse V-joint 68 is illustrated. It includes a V groove 70 in the divider 46 and a mating V tip 72 on a rib 74 corresponding to rib 48. The powder color separation function is the same. The process is the same as set forth in the joint of FIG. 5. In this embodiment, regions 74a and 74b are partially filled with the cast material of colors A and B, respectively. When the mold is separated and positioned in the mold-up position at the final cure stage the cast powder colors A and B melt and flow along the inverted tip 72 to form a joint at a welt 76 as shown in FIG. 14.

Another joint configuration 80 for practicing the process of the present invention is set forth in FIG. 7.

The divider 46 is formed with a fixed partition 82 having a gauged clearance 84 with the inside shell mold surface 86 on a rib 88 corresponding to rib 48. A metering plate 90 is slidably mounted on one side 92 of fixed partition 82 and includes an end surface 94 inclined with respect to side 92 to establish an adjustable metering passage 96 between plate 90 and a rib extension 98 of greater height than that of ledge 86. Before the mold/powder box assembly of FIG. 3 is inverted to the position of FIG. 4, metering plate 90 is adjusted to bring surface 94 against rib extension 98 to seal off metering passage 96. When the mold and box are in a fill position powder color B flows into region 86b and powder color A flows into region 99. Then metering plate 90 is adjusted to allow powder color A to drop into region 86a.

The resultant transition joint of the de-molded shell will be in the form of a protrudent line on the single-piece two-color part.

FIG. 8 shows a second embodiment of a metering plate joint 100. It includes a mold 102 with two spaced ribs 104,106 defining a space 108 therebetween. In this embodiment a movable partition 110 has an inclined end surface 112 with a gasket 114 that seals rib extension 104. The tip 116 of a plate 118 is angled to limit powder flow at a shut-off point 19 formed between the plate 118 and the floor 121 between ribs 104 and 106.

During the fill stage flow of powder A occurs through space 108 to partially fill region 108(a). The movable partition 110 and gasket 114 are then moved from the rib extension 104 to allow powder B to flow to the joint line by filling region 108b. Following the powder flow steps the mold and box are returned to a position where the mold is in its mold-up position. The box is removed and the cast material is cured on the heated mold surfaces with the mold in the mold-down position to form an integral joint between the two color panels.

The FIG. 9 process sequence includes the steps of attaching and sealing a first color A powder box 120 (shown in dotted lines with a fragmentary sectioned wall) to a mold 122 to cover only mold surface 124 with one color of powder by use of a box partition 126 engaging a mold rib 128 during a first fill phase as shown in FIG. 9A. The mold and powder box are then rotated to the dump position, excess material is dislodged and the powder box 120 is separated from the mold 122. The cast color A on mold 122 is shown at 129 in FIG. 9B.

A second color box 130 is then attached to the mold 122 and sealed by a partition 132 offset from rib 128 as shown and wherein the end 133 of partition 132 mates to the previously cast color layer 129 on surface 124. Then the parts assume the fill or mold-down position and powder layer 135 of a second color overlaps color A of region 137 as shown in FIG. 9C to form an integral joint between the two colors.

The mold and powder box are rotated to the dump position, excess material is dislodged and the color box 130 is separated from mold 122. The curing cycle is completed in the mold-up position to form the one-piece, two-color skin shown with the mold in FIG. 9D.

Another process embodiment is illustrated in FIGS. 10A–10D. The first step, shown in FIG. 10A, includes application of a masking strip 134 on a mold 136. Step two, shown in FIG. 10B, includes attaching color A powder box 138 to the mold with partition 140 sealed against strip 134 so that powder A is only cast against mold surface 142 during the fill phase to form a first color layer 144 on mold surface 142.

Figure 12:
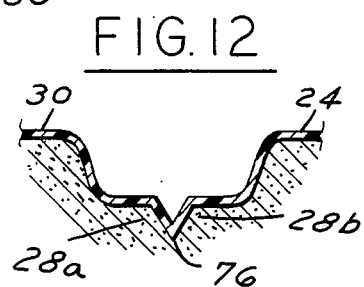
FIG. 12 is an enlarged, fragmentary sectional view of the joint configuration of a shell formed by the V-joint of FIG. 6.

Thereafter, box 138 and mold 136 are rotated to the mold-up, dump position and color box 138 is detached. The mask 134 is removed. Then a color box 144 is connected to mold 136. It has a side partition 150 with an end 152 sealed against previously cast layer 144. The fill phase shown in FIG. 12D casts a second color B layer 154 on mold surface 156 and on layer 144 at an overlap region 158 to form an integral joint in the resultant single-piece two-color part which is cured in accordance with the process sequences previously discussed.

A typical powder casting process for a two-color door panel includes the following sequence.

1. Preheat tool in oven to temperature between 250° F. and 390° F.
2. After mold cast temperature is reached, attach the powder box to the mold.
3. Rotate box and mold 1½ turns clockwise and 1½ turns counterclockwise.
4. Dwell time on top is approximately eight seconds (for additional part thickness, add dwell time).
5. Rotate 180° and unclamp.
6. Return the mold to a cure oven and heat for 2.5 min. in the mold-down position and 2.5 min. in the reverse mold-up position.

Examples of suitable mold heating processes for use with the process and apparatus of the present invention include mold temperature control by heated and cooled air or oil heating and cooling flow as set forth in U.S. Pat. No. 4,217,325 issued Aug. 12, 1980 to D. Colby. Suitable thermoplastic powders include plasticized polyvinyl chlorides and related vinyl resins in dry powder form for ease of gravity flow from the powder charge box 36 during both fill and return steps. Typical examples of parts, plastic materials and mold processes include the following:

Examples of parts that have been made by the PVC powder molding process include a door panel shell having a mold volume of approximately six (6) cubic feet.

PVC resin, plasticizer, stabilizer, release agents and color pigments are combined in a high intensity mixer to produce a dry, flowable powder of each desired color. The process is known in the industry as dry-blending.

The various compound components may be selected as to type and ratio to provide the properties required both for the finished product and for ease of processing. Physical properties will not be too dissimilar from those obtained with liquid plastisol which is also used to manufacture similar products but has an inherent weakness for forming objectionable drips and runs when made in complex shapes.

Processing properties are such that when melting of the plastic powder occurs, densification results in exact reproduction of minute detail such as grain marks and stitches engraved in the mold surface.

Mold preheating temperature may range from 250° F. to 390° F. Since the thickness of the finished product is also governed by the time the powder contacts the mold, it should be understood that simultaneous charging of the powder to the mold can be of definite advantage. Also, if certain areas of the mold can be made to have a lower pre-heated temperature than others, it will permit molding a thinner shell in those areas, since both temperature and mold-filled time determine the final thickness of the shell. Therefore, a very flexible range, for mold-filled time, of one second to ten seconds or more has been established.

Depending on formulation, complete melting or fusion of the PVC powder can occur when mold temperatures reach 350° F. to 450° F.

After fusion, the mold is cooled to a temperature which will facilitate removal of the shell without damage.

Specifically the process and apparatus of the present invention enable even and complete distribution of thermoplastic powder material onto mold surfaces to form large, long, thin-walled single-piece two-color or more shells for interior door panels and the like formed during short cycle mold cycles in limited plant floor space.

While representative embodiments of apparatus and process of the present invention have been shown and discussed, those skilled in the art will recognize that various changes and modifications may be made within the scope and equivalency range of the present invention.

What is claimed is:

1. In a process for molding a single-piece multi-color plastic shell the steps comprising
   (1) heating an open-ended mold to a temperature near the fusing temperature of a plastisol material;
   (2) connecting charge box means to the mold to form a closed system with at least two color plastisol sources;
   (3) initially disposing the mold in the closed system so that the mold is vertically above the charge box means whereby no plastisol material is pre-cast on the mold and sealing an interior portion of the charge box means to a mold divider means to separate a preheated mold into first and second color casting surfaces;
   (4) thereafter rotating the charge box means and mold in a powder casting sequence to release plastisol charges of a separate color onto each of the casting surfaces by gravity to build up a shell of desired shape and size;
   (5) and controlling flow of the separately cast colors at the mold divider means to cause the separately cast colors to join so as to form an integral joint between the plastisol cast on the first and second casting surfaces.

2. In the process of claim 1,
   providing a masking strip on the mold,
   providing charge box means as first and second powder boxes, said connection of the charge box means and mold including sequential connection of a first box in sealed relationship to the masking strip on the mold to divide it into the first and second casting surfaces;
   distributing plastisol against one of the casting surfaces to form a layer of cast plastisol of one color on the first casting surface, removing the first box and the masking strip;
   and sealing a second box against the previously formed layer of cast plastisol at a point offset from an exposed edge of the layer; and casting a layer of plastisol against the second casting surface and in overlapped relationship with the exposed edge so as to form an integral joint between adjacent cast plastisol layers on the mold.

3. In the process of claim 1,
   providing charge box means as first and second boxes, the connection of the charge box means and mold including sequential connection of the first box in sealed relationship to a mold divider rib to cast plastisol of a first color against one of the mold casting surfaces followed by connecting the second box in sealed relationship to the previously cast first color layer to cast plastisol of a second color against the other of the mold casting surfaces and overlapping the cast plastisol of a first color.

4. In the process of claim 3,
   providing the first and second boxes with side walls,
   sealing the first box to the mold by a side wall sealed against the mold divider rib during the casting of the first color plastisol against the one of the mold casting surfaces; and sealing the second box to the mold by a side wall sealed against the previously cast first color at a position offset from the mold divider rib to cause the second color plastisol to cover the rib and a portion of the first cast color so as to form an integral joint between adjacent cast layers of different color on the mold.

5. In the process of claim 1, the flow control step 5 including providing a mold rib cavity and locating the mold divider means therein, distributing the plastisol charges of different color against the side of the mold divider means and into the mold rib cavity to build a joint to integrally connect adjacent cast color strips along a styling line.

6. In the process of claim 5,
   providing a mold rib cavity with V-joint collection regions,
   distributing a plastisol charge of each color into the V-joint powder collection regions; and thereafter positioning the mold and flowing the cast plastisol from each of the collection regions to form a joint for integrally connecting the adjacent cast color strips.

7. In the process of claim 5,
   providing a mold rib cavity in a mold divider rib with first and second plastisol collection regions,
   distributing a plastisol charge of one color through a flow opening into the first plastisol collection region at the mold divider rib; thereafter metering flow of the second color into a second plastisol collection region in communication with the first plastisol collection region; and thereafter curing the plastisols collected in the first and second collection regions to form a joint for integrally connecting adjacent cast color strips in the mold.

8. In the process of claim 7,
   metering flow of the second color by relatively moving a charge box interior portion and a metering plate with respect to the mold divider rib.

9. Apparatus for molding a thin-walled plastic shell in an open-ended mold having heating means from a charge of plastisol material in an open-ended charge box means comprising: means for joining the mold and charge box means in open-ended relationship; at least first and second casting surfaces on the mold; means for rotating the mold and charge box means such as to distribute two charges of different color against the separate casting surfaces of the mold by gravity; joint formation means operative to form a joint along a line on the mold between the separate casting surfaces to form a single-piece shell with first and second colored segments joined at a style line;
   said joint formation means including said charge box means having a single open-end box having at least one divider wall separating the box into first and second open end compartments each having a predetermined charge of plastisol of different color;

said mold having a divider rib engageable with said divider wall at the first and second casting surfaces on the mold for receiving plastisol from the first and second open end compartments when the box and mold are joined and rotated;

and plastisol flow control means including co-acting means on said divider wall and divider rib to form first and second plastisol collection regions for directing plastisol cast on each of the first and second casting surfaces to be in physical engagement at a joint line;

and means for separating said mold from said charge box and curing plastisol at the collection regions to form an integral joint between cast on said separate casing surfaces of said mold.

10. In the combination of claim 9;

said plastisol flow control means including movable metering plate; said divider wall and movable metering plate being selectively positioned with respect to said mold divider rib during a fill phase when plastisol of a different color is cast onto the separate mold casting surfaces to produce flow of one of the charges of plastisol into one of the plastisol collection regions and to position the metering plate to produce flow of another of the charges of plastisol into the other plastisol collection region to form an integral joint between shell segments cast on the separate mold casting surfaces.

11. In the combination of claim 9;

said plastisol flow control means including V-joint means defining collection regions on either side of said divider wall adjacent to said divider rib;

and means for positioning said mold to allow plastisol to flow from the collection regions to be cured at a V-shaped joint line on the shell with a sharp radius groove that defines a transition line between portions of the shell formed by plastisol cast on the first and second casting surfaces of the mold.

12. In the combination of claim 11;

said mold divider rib having a ledge and a rib extension, said divider wall being spaced from said ledge to define the first plastisol collection region;

said metering plate having an angular end surface movable with respect to said rib extension to define the second plastisol collection region and a flow control orifice for regulating flow of plastisol to the second plastisol collection region.

13. In the combination of claim 11;

said metering plate having a gasket means engageable with said mold divider rib to form the first plastisol collection region; said divider wall being movable and engageable with said rib and having end means cooperating with said rib to form the second plastisol region; said gasket means being operable to release plastisol from said first plastisol collection region to flow into contact with plastisol in the second plastisol collection region to form an integral joint between different color plastisols cast on said mold.

* * * * *